(12) United States Patent
Adireddy et al.

(10) Patent No.: US 7,079,586 B1
(45) Date of Patent: Jul. 18, 2006

(54) SYSTEMS AND METHODS FOR OPTIMAL DISTRIBUTION OF SYMBOLS IN A FIXED SIZE DATA PACKET TO IMPROVE RECEIVER PERFORMANCE

(75) Inventors: Srihari Adireddy, Ithaca, NY (US); Lang Tong, Ithaca, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 1069 days.

(21) Appl. No.: 09/627,190

(22) Filed: Jul. 27, 2000

Related U.S. Application Data (60) Provisional application No. 60/189,768, filed on Mar. 16, 2000.

(51) Int. Cl.
H04B 15/00 (2006.01)
H04L 25/08 (2006.01)

(52) U.S. Cl. .................................. 375/285; 375/348

(58) Field of Classification Search ................ 375/222, 375/229, 232, 233, 340, 348, 285; 714/758; 370/347
See application file for complete search history.

(56) References Cited

U.S. PATENT DOCUMENTS

| | | | | |
|---|---|---|---|---|
| 4,489,416 A | * | 12/1984 | Stuart | 375/231 |
| 5,052,000 A | * | 9/1991 | Wang et al. | 714/758 |
| 5,127,051 A | * | 6/1992 | Chan et al. | 375/348 |
| 5,164,961 A | * | 11/1992 | Gudmundson | 375/229 |
| 5,353,307 A | * | 10/1994 | Lester et al. | 375/233 |
| 5,416,767 A | * | 5/1995 | Koppelaar et al. | 370/210 |
| 5,488,635 A | * | 1/1996 | Chennakeshu et al. | 375/340 |
| 5,513,214 A | | 4/1996 | Gozzo | 375/232 |
| 5,513,216 A | * | 4/1996 | Gadot et al. | 375/233 |
| 5,521,908 A | * | 5/1996 | Younce et al. | 370/286 |
| 5,557,645 A | * | 9/1996 | Dent | 375/340 |
| 5,561,468 A | * | 10/1996 | Bryan et al. | 348/469 |
| 5,694,424 A | * | 12/1997 | Ariyavisitakul | 375/233 |
| 5,742,642 A | | 4/1998 | Fertner | 375/233 |
| 5,809,086 A | | 9/1998 | Ariyavistakul | 375/332 |
| 5,875,215 A | * | 2/1999 | Dobrica | 375/344 |
| 5,949,819 A | * | 9/1999 | Bjarnason et al. | 375/222 |
| 6,088,390 A | * | 7/2000 | Russell et al. | 375/233 |
| 6,169,759 B1 | * | 1/2001 | Kanterakis et al. | 375/130 |
| 6,252,904 B1 | * | 6/2001 | Agazzi et al. | 375/233 |
| 6,285,681 B1 | * | 9/2001 | Kolze et al. | 370/442 |
| 6,289,063 B1 | * | 9/2001 | Duxbury | 375/348 |
| 6,314,135 B1 | * | 11/2001 | Schneider et al. | 375/232 |
| 6,366,569 B1 | * | 4/2002 | Ritter | 370/337 |

(Continued)

FOREIGN PATENT DOCUMENTS

DE 4236178 A1 8/1998

(Continued)

OTHER PUBLICATIONS

PHA 23,836, filed concurrently herewith.

(Continued)

*Primary Examiner*—Emmanuel Bayard
*Assistant Examiner*—Lawrence B. Williams
(74) *Attorney, Agent, or Firm*—Larry Liberchuk (57) ABSTRACT

There is disclosed a transmitter for transmitting a stream of known symbols and unknown symbols through a transmission channel to a first receiver that receives the transmitted stream of known symbols and unknown symbols distorted by intersymbol interference (ISI) and reduces therein an ISI signal. The transmitter comprises a known symbol distribution controller capable of inserting a plurality of known symbol clusters into an outgoing stream of unknown symbols in an optimum distribution in order to improve the performance of the first receiver.

19 Claims, 7 Drawing Sheets

U.S. PATENT DOCUMENTS

| | | | |
|---|---|---|---|
| 6,377,640 B1 * | 4/2002 | Trans | 375/354 |
| 6,400,761 B1 * | 6/2002 | Smee et al. | 375/232 |
| 6,404,809 B1 * | 6/2002 | Zhang | 375/232 |
| 6,414,989 B1 * | 7/2002 | Olafsson et al. | 375/229 |
| 6,466,569 B1 * | 10/2002 | Wright et al. | 370/347 |
| 6,493,399 B1 * | 12/2002 | Xia et al. | 375/296 |
| 6,507,585 B1 * | 1/2003 | Dobson | 370/420 |
| 6,560,321 B1 * | 5/2003 | Chen et al. | 379/100.17 |
| 6,580,705 B1 * | 6/2003 | Riazi et al. | 370/347 |
| 6,608,862 B1 * | 8/2003 | Zangi et al. | 375/232 |
| 6,625,236 B1 * | 9/2003 | Dent et al. | 375/341 |
| 6,791,995 B1 * | 9/2004 | Azenkot et al. | 370/436 |
| 2001/0009565 A1 * | 7/2001 | Singvall | 375/233 |
| 2003/0123585 A1 * | 7/2003 | Yen | 375/350 |

FOREIGN PATENT DOCUMENTS

| | | |
|---|---|---|
| GB | 2291316 A | 1/1996 |

OTHER PUBLICATIONS

PHA 23,837, filed concurrently herewith.
PHA 23,838, filed concurrently herewith.

* cited by examiner

SYSTEMS AND METHODS FOR OPTIMAL DISTRIBUTION OF SYMBOLS IN A FIXED SIZE DATA PACKET TO IMPROVE RECEIVER PERFORMANCE

This application claims priority under 35 U.S.C. §119(e) to U.S. Provisional Patent Application No. 60/189,768 entitled "Optimal Symbol Distribution for Intersymbol Interference Channels with a Block DFE Receiver" filed Mar. 16, 2000.

CROSS-REFERENCE TO RELATED APPLICATIONS

This application claims priority under 35 U.S.C. § 119(e) to U.S. Provisional Patent Application No. 60/189,768 entitled "Optimal Symbol Distribution for Intersymbol Interference Channels with a Block DFE Receiver" filed on Mar. 16, 2000.

The present invention is related to those disclosed in the following United States patent applications:

1. Ser. No. 09/627,237, filed concurrently herewith, entitled "SYSTEMS AND METHODS FOR PRECURSOR CANCELLATION OF INTERSYMBOL INTERFERENCE IN A RECEIVER";

2. Ser. No. 09/627,191, filed concurrently herewith, entitled "SYSTEMS AND METHODS FOR OPTIMAL SYMBOL SPACING TO MINIMIZE INTERSYMBOL INTERFERENCE IN A RECEIVER"; and 3. Ser. No. 09/627,453, filed concurrently herewith, entitled "DUAL EQUALIZER FOR USE IN A RECEIVER AND METHOD OF OPERATION".

The above applications are commonly assigned to the assignee of the present invention. The disclosures of these related patent applications are hereby incorporated by reference for all purposes as if fully set forth herein.

TECHNICAL FIELD OF THE INVENTION

The present invention is directed, in general, to wireless and wireline receivers and, more specifically, to a system and method for distributing blocks of known symbols among unknown symbols in a transmitted fixed-size data packet in order to improve the performance of a receiver.

BACKGROUND OF THE INVENTION

The rapid advance of digital technology has created a great demand for, and corresponding advances in, wireless and wireline technology for communicating voice and data traffic. Much of this traffic is carried by the public switched telephone network over fiber optic cable and copper wire. Computers and other data equipment communicate over the Internet and a variety of proprietary local area networks (LANs) and wide area networks (WANs). Increasingly, various types of digital subscriber line (DSL) service or cable modem service are bringing broadband data into homes and offices. Many third generation cellular telephones and wireless PDA devices are also equipped to handle broadband data traffic and Internet capable.

However, even the most modern of wireless and wireline data communication equipment still must contend with age-old problems inherent in transmitting data through a channel from a transmitter to a receiver. Data is often transmitted as a series of pulses (or symbols) through a wire or the atmosphere. The data symbols may become distorted due to intersymbol interference (ISI), which is an overlap of adjacently transmitted symbols. In a wireless network, ISI may be caused by reflections of the transmitted symbols off natural objects (e.g., tress, hills) and man-made objects (e.g., buildings, brides) in the environment. The reflections cause multiple time-delayed, partially overlapping copies (echoes) of the same signal to arrive at the receiver. ISI also may occur in a non-linear, bandwidth limited channel if the symbol transmission rate is comparable to or exceeds the channel bandwidth, W.

Receivers frequently use a well-known technique, adaptive decision feedback equalization, to minimize the effects of ISI. An adaptive decision feedback equalizer (DFE) consists of a feedforward (or forward) filter, a feedback filter, and a decision circuit that decides or detects the value of each symbol in the received signal. The input to the forward filter is the received distorted sequence of data symbols. The input to the feedback filter is the sequence of previously decided (detected) symbols at the output of the decision circuit. The feedback filter removes from the symbol presently being estimated that portion of the ISI that is caused by previously detected symbols.

There are limitations, however, to the performance of decision feedback equalizers. Even under the best of circumstances, a DFE occasionally makes an incorrect decision regarding the value of a received data symbol. The incorrect estimate is then propagated back to the feedback filter, thereby affecting decisions regarding subsequent symbols. Furthermore, a DFE almost always does not perform detection on the first copy of a symbol as it is received. Because of the performance of the channel, symbol reflections may combine in such a way that the peak power of the transmitted symbol occurs after the first echo of the symbol enters the DFE. Thus, some reflections of a symbol (postcursors) are received by the DFE after a symbol is detected, but other reflections of a symbol (precursors) are received by the DFE before the symbol is due to be detected. A conventional DFE is unable to compensate for precursor ISI in the detection of the present symbol because of the causal nature of the feedback filter.

For example, in a sequence of ten symbols, the DFE may be working on detecting (deciding) the fifth symbol. However, precursor ISI from the sixth and seventh symbols and post-cursor ISI of the third and fourth symbols may contribute to distortion of the fifth symbol. Since the third and fourth symbols have already been decided by the decision circuit, the feedback loop can be used to remove the post-cursor ISI. However, since the sixth symbol has not been detected yet, the feedback filter does nothing to remove the precursor ISI.

The performance of a DFE also is affected by the type of data on which the receiver operates. In digital television and radio systems, a continuous stream of incoming data symbols must be processed in real time. This places a practical limit on the amount of signal processing that can occur during the detection of symbols. In a real time system, the DFE can only operate on a relatively small window of symbols in an infinite stream of incoming symbols. The real time system cannot account for long delayed ISI from other data symbols outside the window of symbols being processed.

Other types of systems, however, have better performance because data symbols are received in finite-sized data blocks that may be repeatedly analyzed "offline," rather than in real time, by a DFE, including a block DFE specifically designed to operate on fixed-size data blocks. For example, data symbols are transmitted in fixed-size data packets on the Internet and different types of LAN and WAN networks. A network or Internet receiver can signal process the fixed-size data packet offline and simultaneously determine all of the symbols in the data packet. Because the packet size is known and there are transmission delays between data packets, all ISI (precursor and postcursor) affecting the symbols in a data packet are due to other data symbols in the same data packet. This property permits more reliable detection of data symbols. The performance of the receiver is further enhanced by inserting blocks of known symbols in an optimal manner in the unknown symbols generated by a user application. Known symbols are primarily introduced for purposes such as channel estimation, synchronization, or the like, but known symbols can also be used to improve detection by reducing the ISI in the data block.

Some real time communication systems also transmit data symbols in fixed size data packets that include known and unknown symbols. If the symbol rate of such a real-time communication system is relatively low, such as in a Global System for Mobile (GSM) network, the same benefits may be realized because there is sufficient time between data packets to permit analysis of the entire data packet simultaneously. Nonetheless, even with fixed-size data packets, conventional DFEs and block DFEs occasionally makes an incorrect decision regarding the value of a received data symbol.

There is therefore a need in the art for improved receivers and transmitters for use in communication networks. In particular, there is a need in the art for improved decision feedback equalizers that have a lower detected symbol error rate. More particularly, there is a need for improved transmitters and data networks that are capable of maximizing the performance of receivers that contain decision feedback equalizers that operate on fixed-size data packets.

SUMMARY OF THE INVENTION

To address the above-discussed deficiencies of the prior art, it is a primary object of the present invention to provide a transmitter for transmitting a stream of known symbols and unknown symbols through a transmission channel to a first receiver that receives the transmitted stream of known symbols and unknown symbols distorted by intersymbol interference (ISI) and reduces therein an ISI signal. According to an advantageous embodiment of the present invention, the transmitter comprises a known symbol distribution controller capable of inserting a plurality of known symbol clusters into an outgoing stream of unknown symbols in an optimum distribution in order to improve the performance of the first receiver.

According to one embodiment of the present invention, the known symbol distribution controller is capable of determining a channel order, L, associated with the receiver.

According to another embodiment of the present invention, the known symbol distribution controller determines the optimum distribution according to a value of the channel order.

According to still another embodiment of the present invention, the known symbol distribution controller determines a minimum size of each of the plurality of known symbol clusters according to the value of the channel order.

According to yet another embodiment of the present invention, the transmitted stream of known symbols and unknown symbols is received by a plurality of receivers and wherein the known symbol distribution controller is capable of determining a plurality of channel orders, $L_1$ through $L_n$, wherein each channel order is associated with a corresponding one of the plurality of receivers.

According to a further embodiment of the present invention, the known symbol distribution controller is capable of determining a maximum one of the plurality of channel orders.

According to a still further embodiment of the present invention, the known symbol distribution controller determines the optimum distribution according to a value of the maximum channel order.

According to a yet further embodiment of the present invention, the known symbol distribution controller determines a minimum size of each of the plurality of known symbol clusters transmitted to all of the plurality of receivers according to the value of the maximum channel order.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 7, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged transmitter and communication network.

Many wireline and wireless communication systems transmit a known sequence of symbols, called a training sequence, along with the unknown sequence of user data symbols in order to synchronize and adjust the receiver. The timing and values of the symbols in the training sequence are known by the receiver, thereby making the training sequence relatively easy to detect. An adaptive algorithm controller in the receiver analyzes the received training sequence, compares it to the known sequence, and uses the statistical properties of the received signal to adjust the values of the weighting coefficients in the forward filter and feedback filter of the DFE. When the fixed-size data packet of known and unknown symbols is received, the DFE is better able to detect the correct values of the unknown symbols. The present invention provides an improved transmitter that transmits the known symbols in an optimum manner to maximize the receiver performance.

Figure 1A:
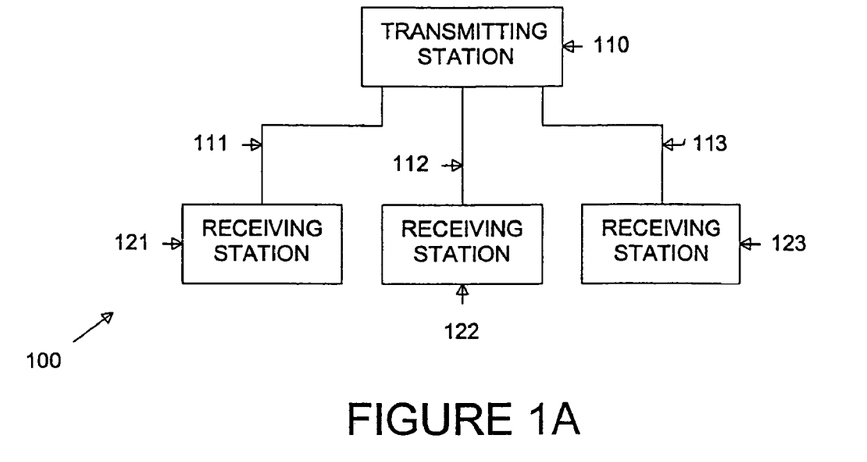
FIG. 1A illustrates an exemplary wireline network according to one embodiment of the present invention.

FIG. 1A illustrates exemplary wireline network 100 according to one embodiment of the present invention. Wireline network 100 comprises transmitting station 110 and receiving stations 121, 122 and 123. Transmitting station 110 communicates with receiving station 121–123 via wirelines 111, 112 and 113. The words "transmitting" and "receiving" with respect to transmitting station 110 and receiving stations 121–123 are exemplary only and should not be construed to limit the scope of the invention to one-way communication. In fact, in advantageous embodiments of the present invention, transmitting station 110 may comprise transceiver circuitry capable of transmitting data to, and receiving data from, receiving stations 121–123. Accordingly, in such embodiments, receiving station 121–123 also may comprise transceiver circuitry capable of transmitting data to, and receiving data from, transmitting station 110. Both transmitting station 110 and each of receiving stations 121–123 transmit data to a receiving device as mixture of known symbol sequences (e.g., training sequences) and unknown symbols (i.e., user data).

By way of example, in one embodiment of the present invention, transmitting station 110 may comprise a server in a local area network (LAN) or wide area network (WAN) that communicates bidirectionally with client nodes (i.e., receiving stations 121–123). In an alternate embodiment of the present invention, transmitting station 110 may comprise a cable television broadcast system that primarily transmit video signals to cable set-top boxes (i.e., receiving stations 121–123) in subscriber homes. However, transmitting station 110 may also receive upstream data traffic transmitted by the cable set-top boxes (STBs).

Figure 1B:
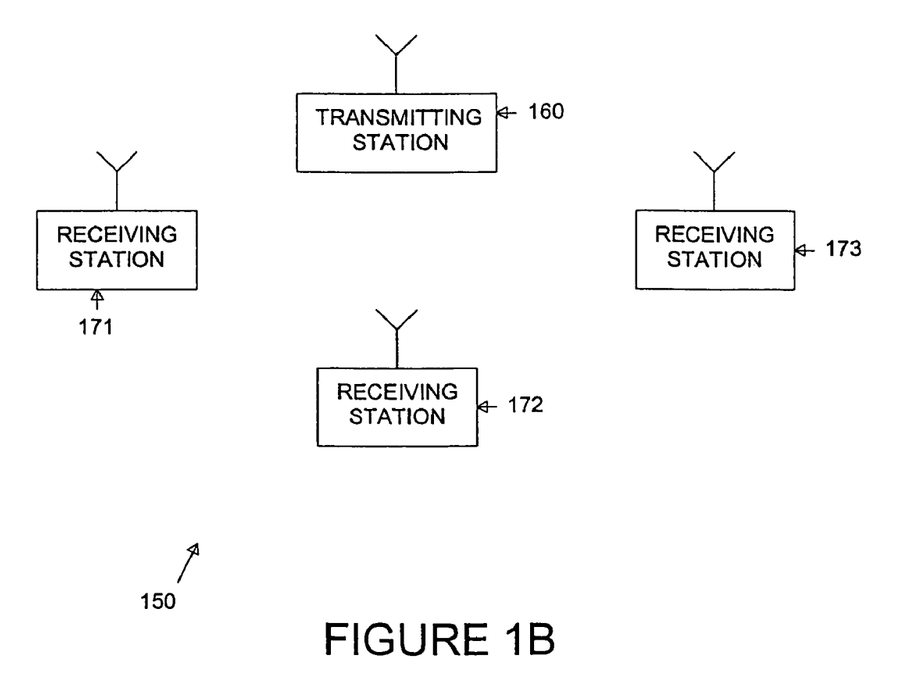
FIG. 1B illustrates an exemplary wireless network according to one embodiment of the present invention.

FIG. 1B illustrates exemplary wireless network 150 according to one embodiment of the present invention. Wireless network 150 comprises transmitting station 160 and receiving stations 171, 172 and 173. Transmitting station 160 communicates via the air interface with receiving station 171–173. Again, the words "transmitting" and "receiving" with respect to transmitting station 160 and receiving stations 171–173 are exemplary only and should not be construed to limit the scope of the invention to one-way wireless communication. In fact, in advantageous embodiments of the present invention, transmitting station 160 may comprise, transceiver circuitry capable of wirelessly transmitting data to, and wirelessly receiving data from, receiving stations 171–173. Accordingly, in such embodiments, receiving station 171–173 also may comprise transceiver circuitry capable of wirelessly transmitting data to, and wirelessly receiving data from, transmitting station 160. Both transmitting station 160 and each of receiving stations 171–173 transmit data to a receiving device as mixture of known symbol sequences (e.g., training sequences) and unknown symbols (i.e., user data).

By way of example, in one embodiment of the present invention, transmitting station 160 may comprise a server in a wireless LAN or WAN that communicates bidirectionally with client nodes (i.e., receiving stations 171–173). In an alternate embodiment of the present invention, transmitting station 160 may comprise a base transceiver station in a cellular network that transmits voice and data traffic to mobile stations (i.e., receiving stations 171–173) and receive voice and data traffic from the mobile stations (e.g., cell phones). In still another embodiment of the present invention, transmitting station 160 may comprise a high definition television (HDTV) broadcast facility that transmits high definition video signals to HDTV receivers (i.e., receiving stations 171–173) in its local coverage area.

In both wireline network 100 and wireless network 150, each transmitted data symbol arrives at the receiving device distorted by postcursor and precursor intersymbol interference (ISI) caused by the band-width limited transmission channel and or reflections off objects. To minimize the effects of ISI, receiving stations 121–123 and receiving stations 171–173 comprise adaptive block decision feedback equalizers (DFEs) capable of reducing postcursor ISI and/or precursor ISI in accordance with the principles of the present invention. Furthermore, in bidirectional communication networks, transmitting stations 110 and 160 also may comprise adaptive block DFEs capable of reducing postcursor ISI and/or precursor ISI in signals transmitted by receiving stations 121–123 and receiving stations 171–173.

Figure 2:
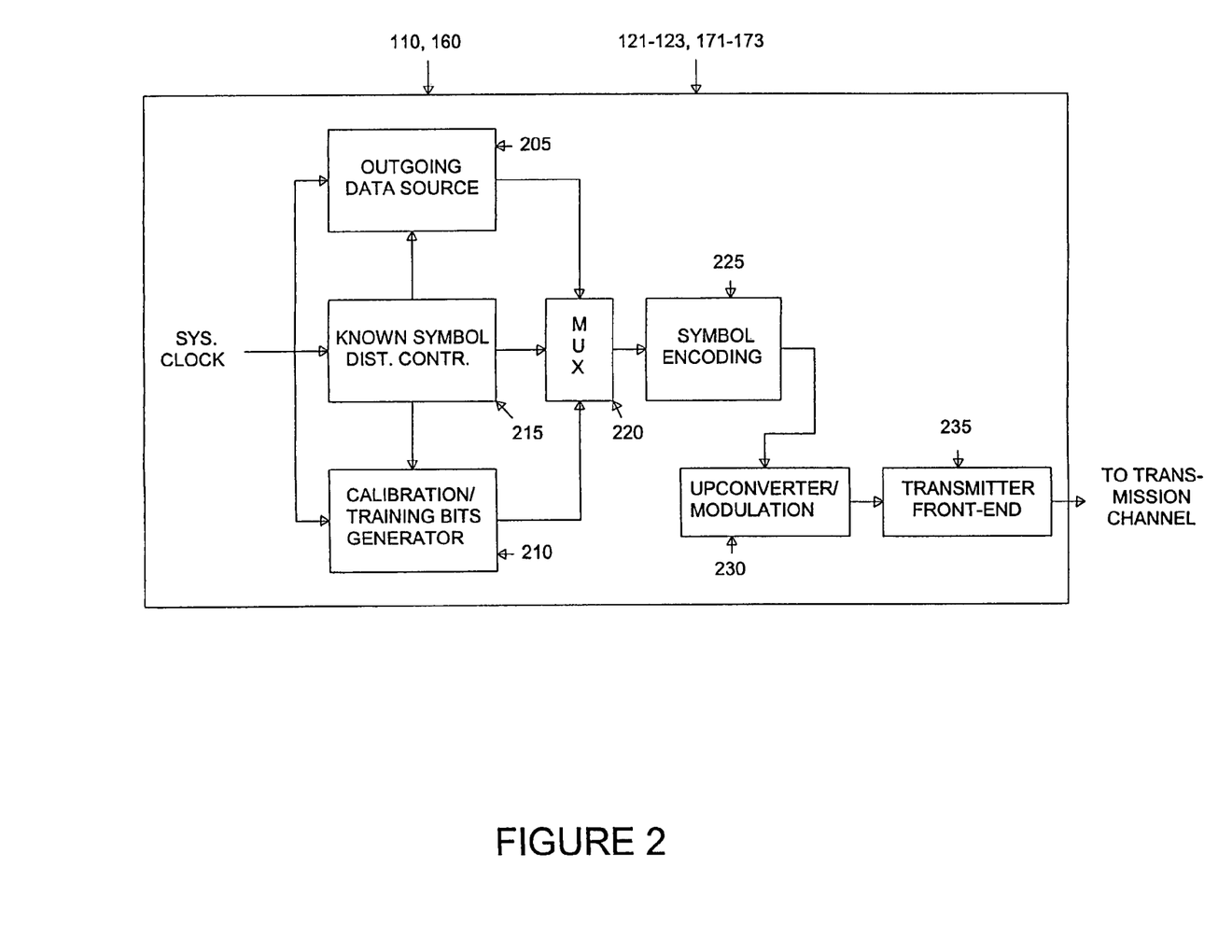
FIG. 2 illustrates selected portions of exemplary transmitter circuitry disposed in the transmitting stations and, for two-way systems, the receiving stations in FIGS. 1A and 1B.

FIG. 2 illustrates selected portions of exemplary transmitter circuitry disposed in transmitting stations 110 and 160 and, for two-way systems, receiving stations 121–123 and 171–173. The exemplary transmitter circuitry comprises outgoing data source 205, calibration/training bits generator 210, known symbol distribution controller 215, multiplexer 220, symbol encoding circuitry 225, up-converter/modulation circuitry 230, and transmitter front-end circuitry 235. Outgoing data source 205 generates the user data that is to be transmitted to a receiving device. For example, outgoing data source 205 may be a cell phone vocoder that converts an analog voice signal to digital data to be transmitted to a base transceiver station. Alternatively, outgoing data source 205 may be an application executed on a server that transmits data to a client work station via a wireline LAN.

The user data generated by outgoing data source 205 are unknown data bits that are combined with known data bits generated by calibration/training bits generator 210. Calibration/training bits generator 210 may generated a training sequence that precedes the unknown user data. Calibration/training bits generator 210 also may generate additional training sequences that are distributed among the unknown data as a single block or in a plurality of smaller blocks at known intervals or locations among the unknown user data. For example, in a GSM mobile phone network, a GSM data packet comprises 148 bits, including 116 user data bits. The GSM data packet also comprises 3 start bits at the start of the user data, a 26-bit training sequence in the middle of the user data bits, and 3 stop bits at the end of the user data bits.

The size and location of the training/calibration sequences of known data bits are controlled by known symbol distribution controller 215, which selectively switches the source of data that is output by multiplexer (MUX) 220. Thus, the output of MUX 220 is a stream of known calibration/training bits interspersed at known locations among unknown user data bits. In an advantageous embodiment of the present invention, known symbol distribution controller 215 is an adaptive device that is capable of modifying the size and location of groups of calibration/training bits according to the known characteristics of the receiver. More particularly, known symbol distribution controller 215 is capable of modifying the size and location of groups of calibration/training bits in order to maximize the performance of the improved precursor ISI cancellation decision feedback equalizer (DFE) in the receiving device.

Symbol encoding circuitry 225 encodes the data bits according to any known symbol encoding scheme. Thus, a Logic 1 bit received from multiplexer 225 may be encoded as a first unique sequence of pulses and a Logic 0 bit received from multiplexer 225 may be encoded as a second unique sequence of pulses. Thus, the output of symbol encoding circuitry 225 is the sequence of known and unknown symbols that must be detected by the receiver DFE.

Up-converter/modulation circuitry 230 converts the baseband sequence of known and unknown symbols to a modulated (up-converted) signal capable of being transmitted through the transmission channel (wireline or wireless). For example, in a wireless network, up-converter/modulation circuitry 230 may comprise an RF mixer that converts the baseband sequence to a modulated radio frequency (RF) signal capable of being transmitted through the air channel to a receiving device. Finally, transmitter front-end circuitry comprises RF amplifiers, duplexer circuitry, and antennas that transmit the output of up-converter/modulation circuitry 230 into the corresponding wireline or wireless channel.

The arrangement and interconnection of known symbol distribution controller 215, calibration/training bits generator 210, and symbol encoding circuitry 225 is exemplary only. Those skilled in the art will recognize there are numerous other circuit arrangements capable of inserting known symbols at known locations in a sequence of outgoing unknown symbols. The arrangement in FIG. 2 is suitable for those applications in which a symbol is used to represent no more than one data bit. This ensures that a known bit from calibration/training bits generator 210 is encoded only as a known symbol and that an unknown bit from outgoing data source 205 is encoded only as an unknown symbol.

However, in other systems, a single symbol may be used to represent more than one data bit. For example, four different symbols may be used to represent the bit pairs 00, 01, 10, 11. In such a system, precautions must be taken to ensure that symbol encoding circuitry 225 does not encode a known bit and an unknown data bit as a single symbol. To accomplish this, known symbol distribution controller 215 and calibration/training bits generator 210 may be coupled directly to symbol encoding circuitry 225, and multiplexer 220 may be omitted. In such a circuit arrangement, symbol encoding circuitry 225 would encode all unknown data bit pairs from outgoing data source 205 as a sequence of unknown symbols and known symbol distribution controller 215 would cause symbol encoding circuitry 225 to insert known symbols representing known data bit pairs into the outgoing sequence of unknown symbols.

Figure 3:
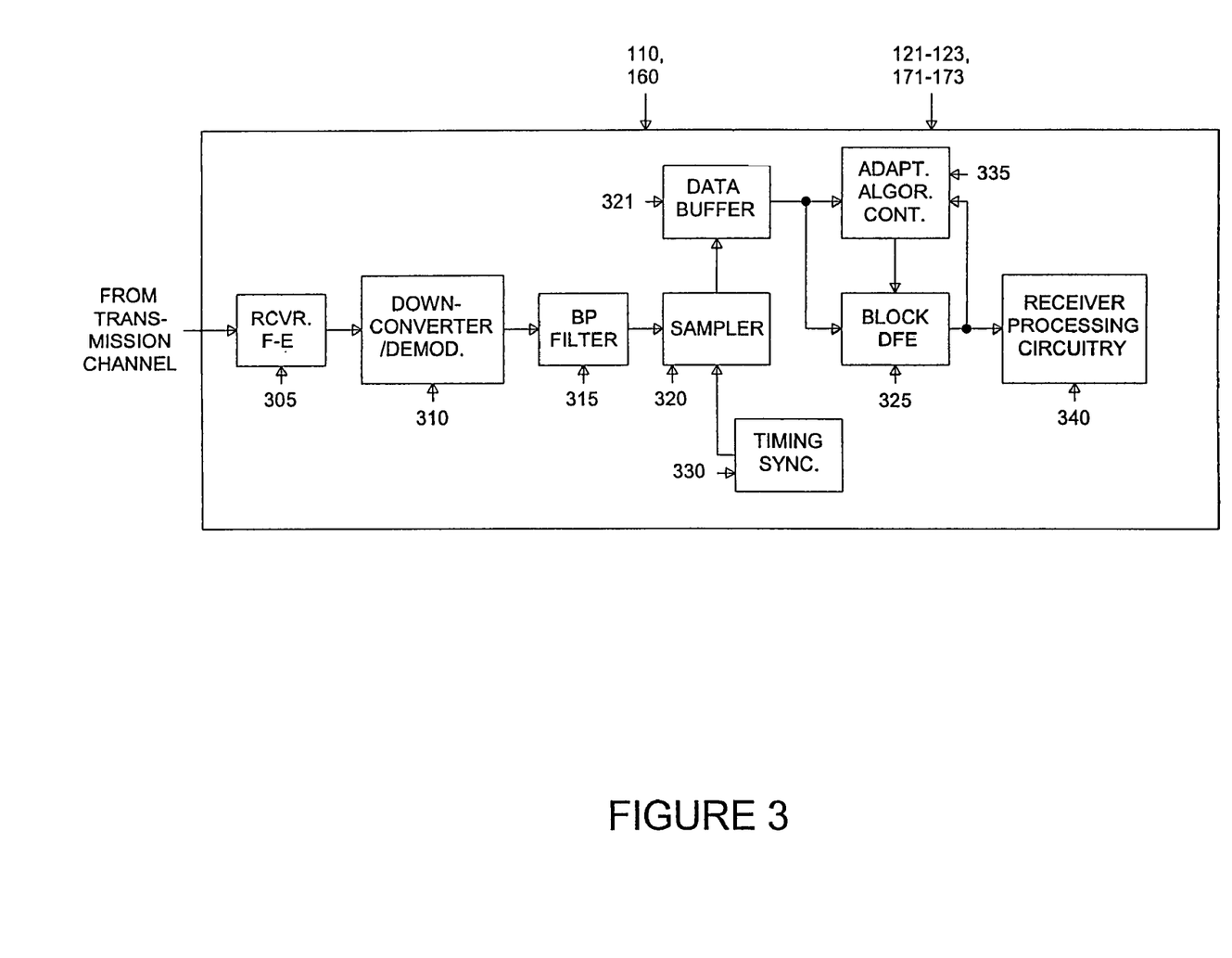
FIG. 3 illustrates selected portions of exemplary receiver circuitry disposed in the receiving stations and, for two-way systems, the transmitting stations in FIGS. 1A and 1B.

FIG. 3 illustrates selected portions of exemplary receiver circuitry disposed in receiving stations 121–123 and 171–173 and, for two-way systems, transmitting stations 110 and 160. The exemplary receiver circuitry comprises receiver front-end (F-E) circuitry 305, down-converter/demodulation circuitry 310, bandpass (BP) filter 315, sampler circuitry 320, data buffer 321, block decision feedback equalizer (DFE) 325, timing synchronization circuitry 330, adaptive algorithm controller 335, and receiver processing circuitry 340. Receiver front-end circuitry 305 typically comprises a low noise amplifier and filters that receive the transmitted fixed-size data packet of known and unknown symbols from the wireline or wireless channels and amplify and isolate the frequencies of interest (i.e., receive band).

Down-converter/demodulation circuitry 310 demodulates (down-converts) the incoming modulated signals to produce an analog baseband signal comprising a sequence of known and unknown symbols that are distorted by postcursor and/or precursor ISI. Sampler circuitry 320 converts the analog baseband signal to a digital baseband signal and stores the digital baseband signal samples in data buffer 321. In one embodiment of the present invention, data buffer 321 stores the samples from the fixed size data packets for subsequent "offline" signal processing by block DFE 325. As explained above, decision feedback equalizers are better able to detect symbols in a finite block (i.e., a fixed-size data packet) than in a continuous real-time stream of symbols. Block DFE 325 retrieves the samples from data buffer 321 after all samples for the fixed-size data packet have been received and determines the symbols for the entire block at the same time. The digital baseband signal is filtered by block DFE 325 to minimize the postcursor and/or precursor ISI distortion.

Timing synchronization circuit 330 synchronizes (aligns) the analog-to-digital converter in sampler circuitry 320. Adaptive algorithm controller 335 receives the output of block DFE 325 and compares it to the input sequence of distorted symbols from data buffer 321. From this comparison, adaptive algorithm controller 335 can determine and modify the weighting coefficients in the forward filter section and the feedback filter section of block DFE 325 in order to minimize ISI distortion. Finally, receiver processing circuitry 340 converts the fixed-size data packet of known (i.e., calibrations/training) symbols and unknown symbols back to data bits and extracts the user data bits according to the algorithm used by known symbol distribution controller 215.

Figure 4:
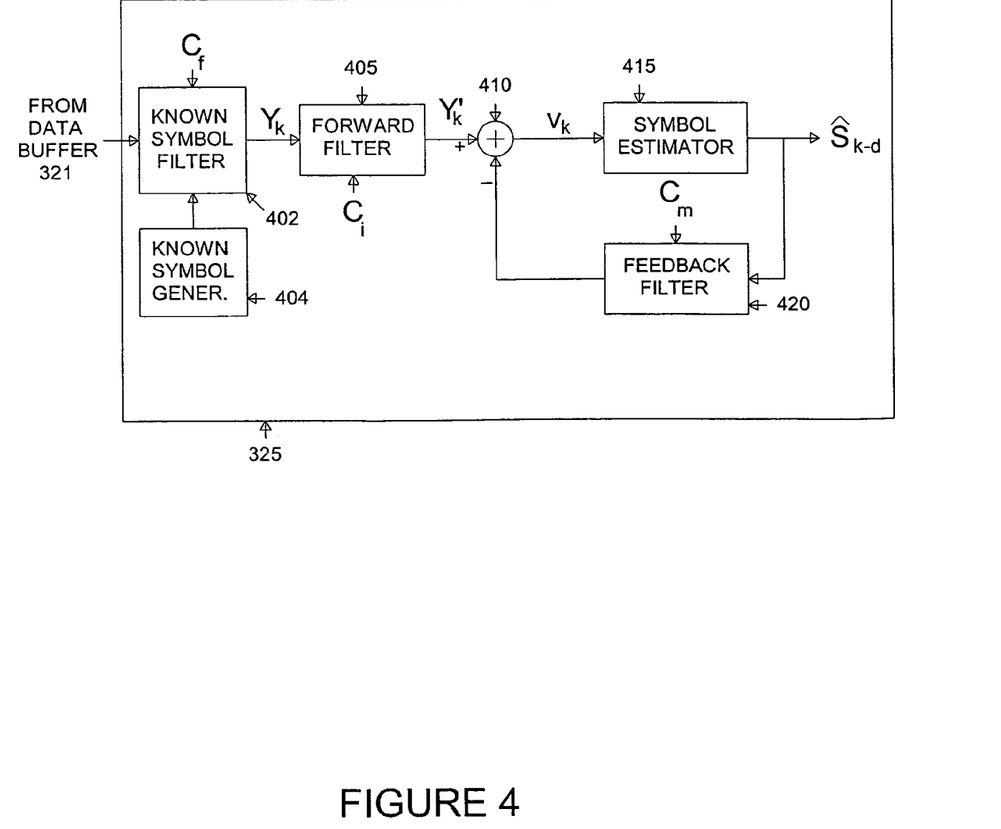
FIG. 4 illustrates an exemplary decision feedback filter in greater detail according to one embodiment of the present invention.

FIG. 4 illustrates exemplary block decision feedback filter (DFE) 325 according to one embodiment of the present invention. Block DFE 325 comprises known symbol filter 402, known symbol generator 404, time-variant forward filter 405, summer 410, symbol estimator 415, and time-variant feedback filter 420 according to a conventional arrangement of a block DFE. As noted above, adaptive algorithm controller 335 determines the values of the weighting coefficients, $C_i$, of forward filter 405 and the weighting coefficients, $C_m$, of feedback filter 420. Adaptive algorithm controller 335 also determines the values of the weighting coefficients, $C_f$, of known symbol filter 402. Adaptive algorithm controller 335 estimates the channel impulse response during receipt of the known training symbols and during receipt of other known symbols, such as known synchronization symbols and known packet identification symbols. If a training sequence is used, known symbol filter 402, forward filter 405 and feedback filter 420 may be adaptively adjusted using the recursive least square (RLS) algorithm or the least mean square (LMS) algorithm.

Known symbol filter 402 receives from data buffer 321 the sequence of data samples for the ISI-distorted symbols. Known symbol filter 402 also receives a sequence of known symbols from known symbol generator 404. Known symbol generator 404 generates known symbols of the correct value and at the correct positions to coincide with the positions of the known symbols received from data buffer 321. Known symbol filter 402 is essentially a summing circuit and filter that subtracts the ISI contribution caused by the known symbols from the sequence of distorted known and unknown symbols. The filter portion of known symbol filter 402 may be a time-variant filter or a time-invariant filter.

Time-variant forward filter 405 receives the sequence of filter symbols, $Y_k$, from known symbol filter 402 and produces an equalized output, $Y'_k$, that is an estimate of the input sequence. Summer 410 add the $Y'_k$ output to an ISI correction signal (explained below in greater detail) feedback filter 420 to produce the symbol estimate, $v_k$. Symbol estimator 415 quantizes the $v_k$ symbol estimate to the nearest symbol value to form a sequence of decided (i.e., detected) symbols, $\hat{S}_{k-d}$, that is transmitted to receiver processing circuitry 340. The quantity k is the index of the current symbol and d is the decision (detection) delay associated with symbol estimator 415. The decided symbol sequence also is transmitted back to feedback filter 420, which removes from the present estimate any ISI signals caused by previously detected symbols (i.e., post-cursor ISI) and/or still undecided symbols (i.e., pre-cursor ISI).

Figure 5:
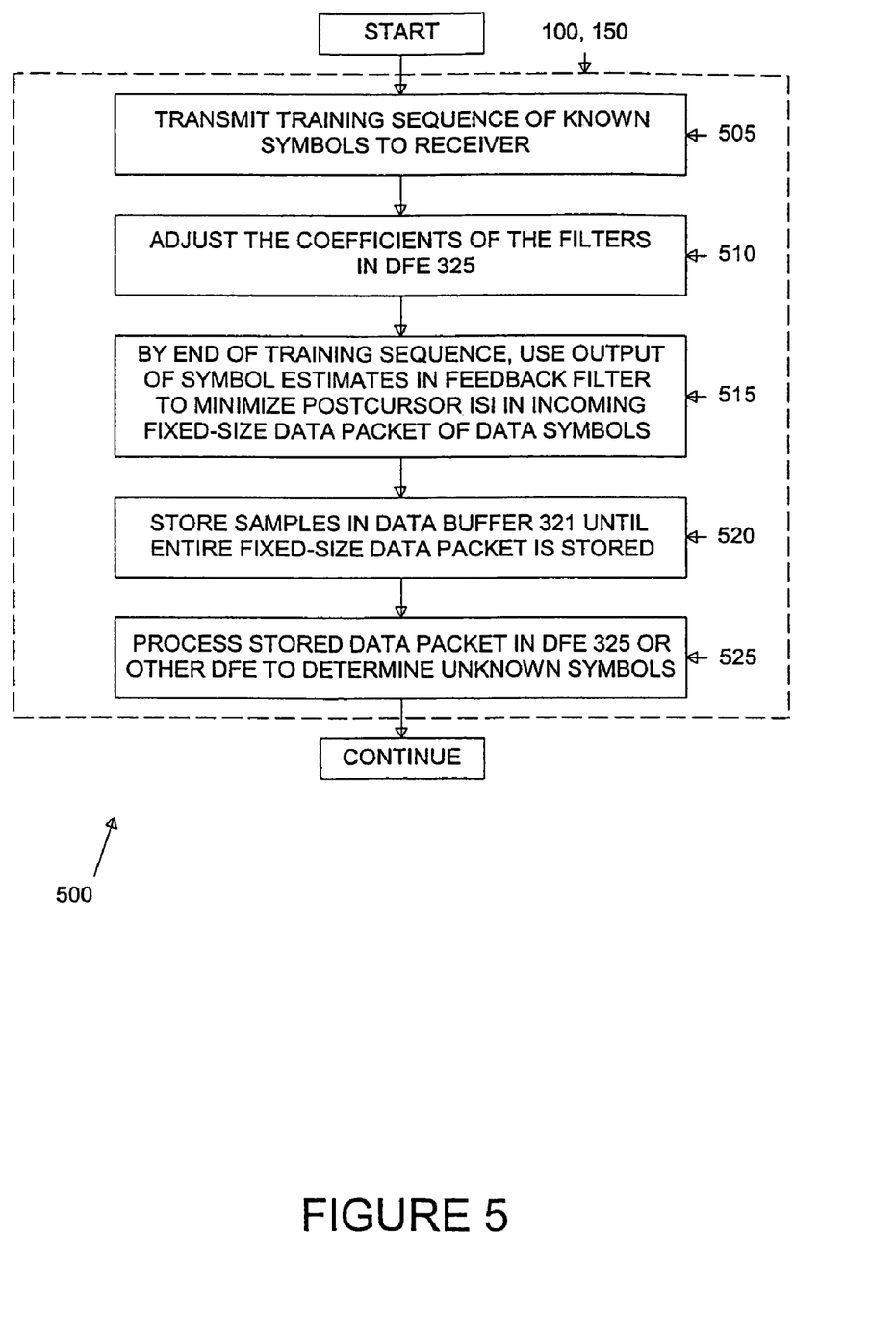
FIG. 5 is a flow diagram illustrating the operation of the transmitters and receivers in the exemplary wireline and wireless networks according to one embodiment of the present invention.

FIG. 5 depicts flow diagram 500 which illustrates the operation of exemplary transmitting stations 110 and 150 and exemplary receiving stations 121–123 and 171–173 in wireline network 100 and wireless network 150 according to one embodiment of the present invention. Transmission of user data begins when, for example, transmitting station 110 transmits a training sequence of known symbols to receiving station 121 (process step 505). Next, adaptive algorithm controller 335 in receiving station 121 adjusts the coefficients of the filters in block DFE 325 to achieve, for example, minimum mean square error (process step 510). By the end of the training sequence, block DFE 325 uses the output of feedback filter 420 to minimize postcursor ISI in subsequent unknown user data symbols (process step 515). The data samples are also stored in data buffer 321 until the entire fixed-size data packet is stored in data buffer 321 (process step 520). Block DFE 325 then re-processes the entire data packet stored in data buffer 321 "offline" in order to better determine the known and unknown symbols (process step 520).

The operation of a receiver containing block DFE 325 may be further improved by known symbol distribution controller 215 in the transmitter. Known symbol distribution controller 215 improves receiver performance by optimizing the spacing (or distribution) of groups of known symbols in the fixed-size data packet in order to improve the performance (i.e., reduce the detection/decision error rate) of block DFE 325. Since cancellation of pre-cursor and postcursor ISI signals caused by a known symbols improves detection of the unknown symbols surrounding the known symbol, it follows that proper distribution of the known symbols may lead to an overall minimization of the symbol detection error rate.

Conventional techniques of distributing known symbols often carry a penalty in performance. For example, the distribution in a GSM data packet of 3 consecutive start symbols, 26 consecutive training symbols, and 3 consecutive stop symbols may not achieve the minimum symbol detection error rate even if block DFE 325 is used. Advantageously, the optimal symbol placement does not depend on the characteristics of the channel. Because known symbol placement is channel independent and controlled entirely by known symbol distribution controller 215 in the transmitting device, the present invention is particularly useful in broadcast applications.

The present invention distributes known symbols in groups (or clusters) whose size is determined by the order, L, of the transmission channel. The cluster size, $\alpha$, is at least equal to the order of the channel, which is equal to the length of the channel minus one (i.e., $\alpha \geq \text{order} = L = \text{length} - 1$). Data are sent in packets of length N. The data packet is assumed to contain P*L known symbols, where L is the order of the channel and P is the number of clusters. The number of unknown symbols is therefore equal to (N−PL). The clusters of known symbols are spaced as evenly as possible between approximately equal size groups of unknown symbols in the data packet in order to achieve a quasi-periodic distribution.

All of the possible placements of the known symbol clusters may be represented by the tuple:

$$n = [n_0, n_1, \ldots, n_p]$$

where $n_i$ denotes the number of unknown symbols present between the $i^{th}$ and the $(i+1)^{th}$ known symbol blocks and $$\Sigma_i n_i = N - PL.$$

For every placement of known symbols clusters, the forward filter and the feedback filter of block DFE 325 are designed to minimize the mean square error for every symbol. The size of each block depends on the particular placement scheme used. The goal is to select the tuple n such that:

$$n^* = \arg\max G(n)$$

where G(n) is the geometric signal-to-noise ratio (SNR) after choosing the minimum MSE forward and feedback filters.

Figure 6:
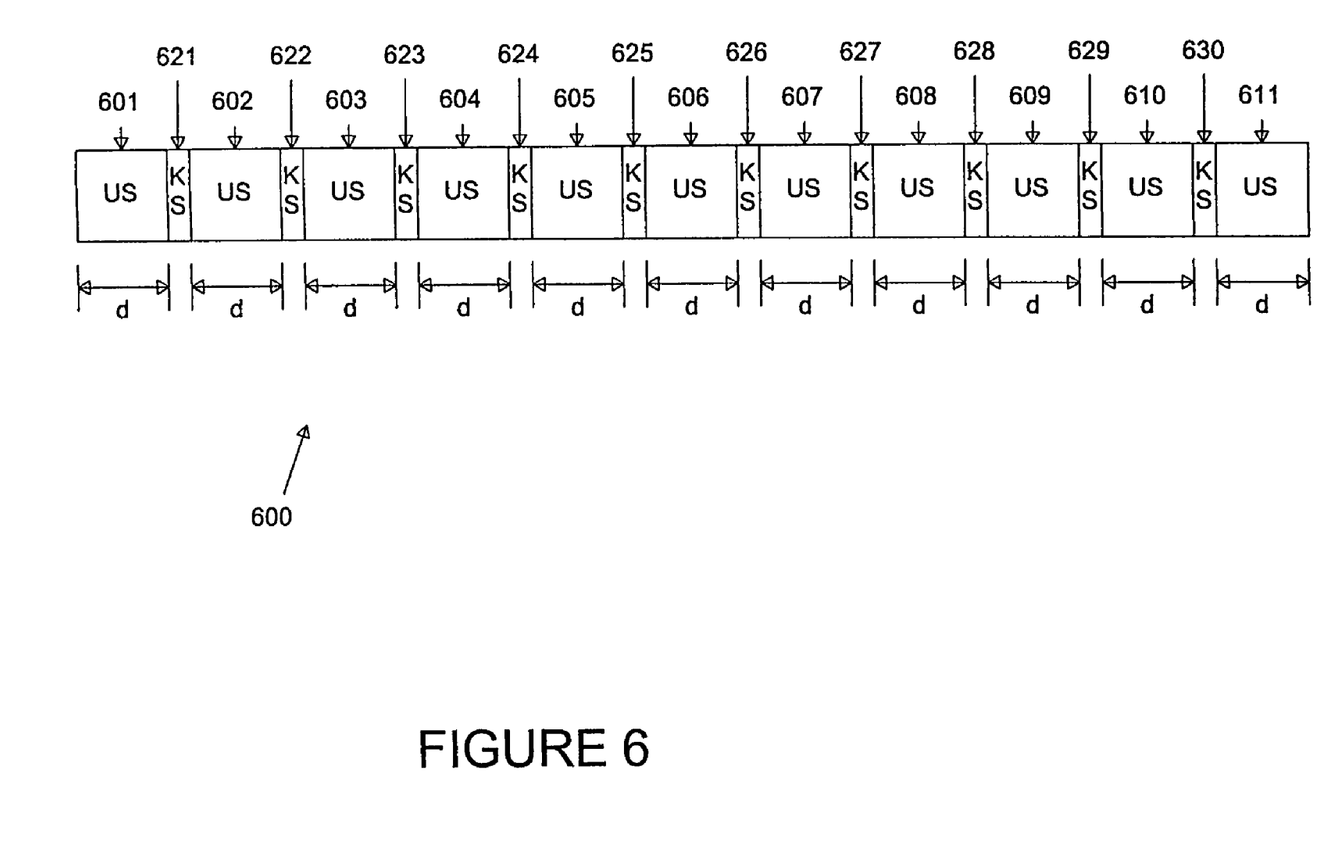
FIG. 6 illustrates an exemplary sequence of known and unknown symbols in which the known symbol distribution optimizes the performance of the receiver DFE according to one embodiment of the present invention.

FIG. 6 illustrates exemplary quasi-periodic distribution 600 of known and unknown symbols according to one embodiment of the present invention. Quasi-periodic symbol distribution 600 optimizes the performance of a receiver containing a DFE. The user data (i.e., unknown symbols) are contained in unknown symbol (US) groups 601–611. Known symbol distribution controller 215 spaces known symbol (KS) clusters 621–630 apart by d. In the exemplary embodiment, it is assumed that a fixed-size data packet has 30 known symbols and 154 unknown symbols. The order of the channel is 3, so that known symbol cluster size, α, is also 3. Thus, the 30 known symbols are divided into 10 known symbol (KS) clusters containing 3 symbols each. The 10 clusters of known symbols are then inserted into the fixed-sized data packet so that the unknown symbols are divided into 11 unknown symbol (US) groups containing 14 unknown symbols each.

If the number of known symbols is not evenly divisible by the order of the channel, then the extra symbols are spread across the clusters so that the size of every cluster differs by no more than one known symbol from any other cluster. For instance, if the fixed-size data packet must contain 32 known symbols and the channel order, L, is 3, then the known symbols are divided into 8 clusters of 3 known symbols and 2 clusters of 4 known symbols (rather than 9 clusters of 3 known symbols and 1 cluster of 5 known symbols). Similarly, if the number of unknown symbols are not evenly divisible by the number of clusters, then the extra unknown symbols are spread across the groups of unknown symbols so that the size of every group differs by no more than one unknown symbol from any other group. For instance, if the fixed-size data packet must contain 150 unknown symbols and there are 10 known symbol clusters (i.e., 11 unknown symbol groups), then the unknown symbols are divided into 7 groups of 14 unknown symbols and 4 groups of 13 unknown symbols (rather than, for example, 10 groups of 14 unknown symbols and 1 group of 10 unknown symbols).

By keeping the sizes of the known symbol clusters approximately equal and also keeping the sizes of the unknown symbol groups approximately equal, the distribution of known symbol clusters can be regarded as "quasi-periodic." The quasi-periodic known symbol distribution may not be unique for a given number of known and unknown symbols in a fixed-size data packet. In the example above where 150 unknown symbols are divided into 7 groups of 14 unknown symbols and 4 groups of 13 unknown symbols, the groups of 14 and the groups of 13 need not be in any particular order. One possible quasi-periodic distribution is:

(14,14,14,14,14,14,14,13,13,13,13).

Another possible quasi-periodic distribution is:

(14,14,13,14,13,14,14,13,14,13,14).

Similarly, in the example above where 32 known symbols are divided into 8 clusters of 3 known symbols and 2 clusters of 4 known symbols, the clusters of 3 and the clusters of 4 need not be in any particular order. One possible quasi-periodic distribution is:

(3,3,3,3,3,3,3,3,4,4).

Another possible quasi-periodic distribution is:

(3,3,4,3,3,3,4,3,3,3).

In general, for a finite impulse response channel of order L, with a packet of size N, of which M are known, a symbol distribution is optimal in the sense of maximizing the geometric signal-to-noise ratio (SNR) if and only if:

$$|A|=|\{i:n_i=q\}|=P+1-r$$

$$|B|=|\{i:n_i=q+1\}|=r$$

where $P=\lfloor M/L \rfloor$, $q=\in (N-PL)/(P+1)\rfloor$, and $r=(N-PL)-q(P+1)$. The notation "$x=\lfloor y \rfloor$" means that the term x is the integer portion of the term y. For example, if y=10.25, the x=10. Similarly, if y=7/3, then x=2.

To properly distribute the known symbols in a transmitted stream of known and unknown symbols, known symbol distribution controller 215 must know the channel order, L, of each of the receiving stations 121–123 and 171–173 in the coverage area of the transmitting stations 110 and 160. The known symbol spacing is determined by known symbol distribution controller 215 according to the largest channel order of any of the receivers. In a one-way broadcast system, such as a high-definition television broadcast system, known symbol distribution controller 215 may determine the length of the known symbol cluster and the quasi-periodic known symbol distribution by considering the typical channels in the field. The receiver may then be informed about the known symbol placement configuration initially. Transmitting station 160 may transmit the selected known quasi-periodic distribution to HD televisions in the area. For example, the quasi-periodic known symbol distribution may be transmitted in a data block immediately following a training symbol sequence. The receivers in the HD televisions then may use the quasi-periodic known symbol distribution to adjust known symbol generator 430 in order to detect subsequently transmitted fixed-size data packets.

In two-way communication networks, however, it is easier for known symbol distribution controller 215 to obtain the channel order values of all of the receivers. For example, in a wireless or wireline LAN, a server may request the channel order values of all receivers in the network. The channel order may be measured or estimated in all receivers. Similarly, in a cellular telephone network, a base station may request the channel order values of all mobile stations in the coverage area of the base station. In either case, the transmitting station can adjust the known symbol distribution to a selected quasi-periodic distribution and relate this information to the receiving stations. If a new receiving station is added to the network that has a longer channel order than any existing receiving station, the transmitting station can recalculate and re-adjust the known symbol distribution and relate the updated known symbol distribution to the receiving stations.

Figure 7:
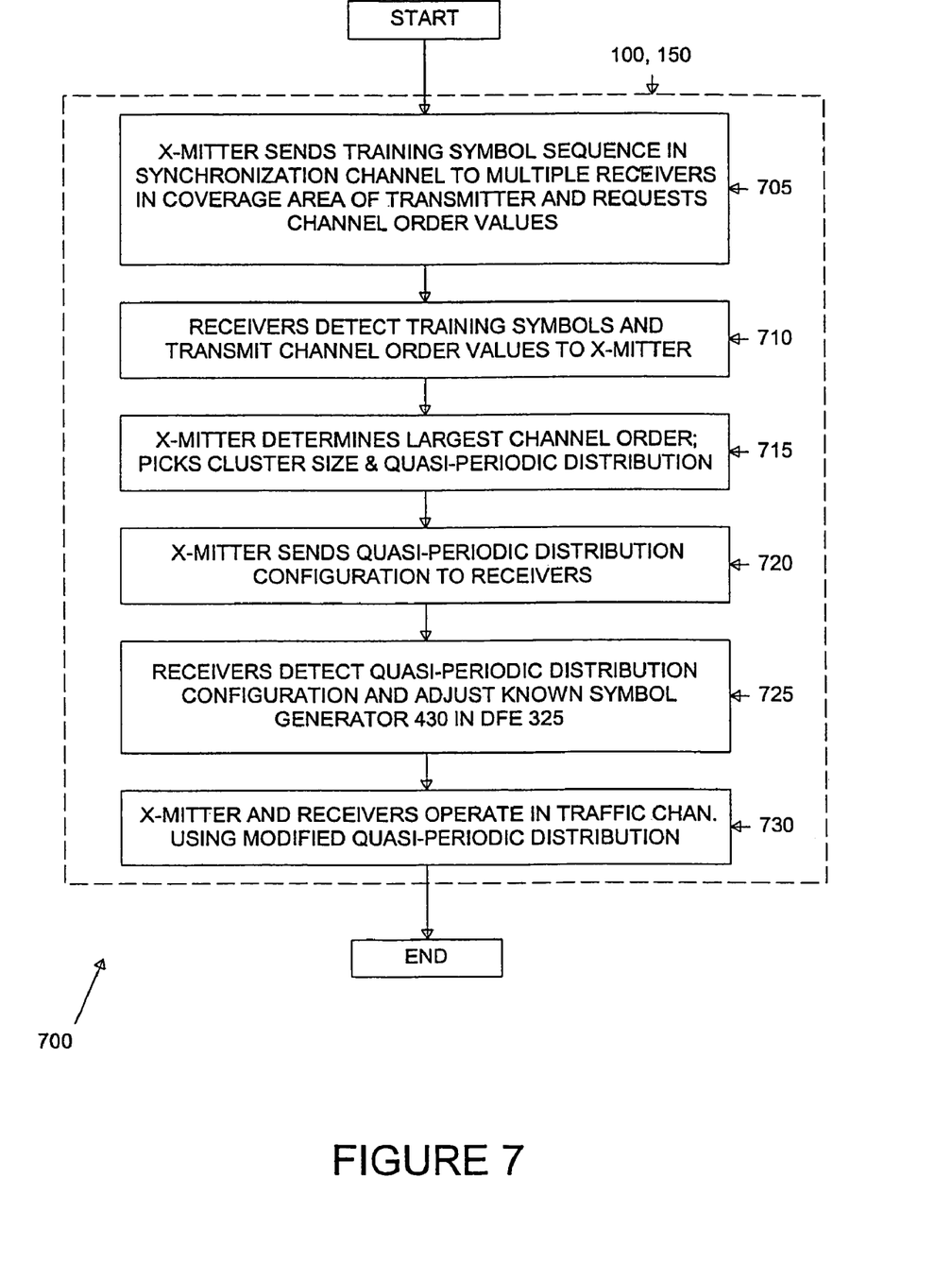
FIG. 7 is a flow diagram illustrating an adaptive known symbol distribution operation in the exemplary wireline and wireless networks according to one embodiment of the present invention.

FIG. 7 depicts flow diagram 700, which illustrates an adaptive quasi-periodic known symbol distribution operation in exemplary wireline and wireless networks 100 and 150 according to one embodiment of the present invention. Initially, a transmitting (X-MITTER) station (transmitting station 160, for example) transmits a training symbol sequence in, for example, a synchronization channel to multiple receivers in its coverage area (or connected to it in a wireline LAN). A special purpose decision channel order request message (or code) is also transmitted to the receivers (process step 705). The receiving stations (receiving stations 171–173, for example) detect the training symbols and the channel order request message and, in response, transmit individual channel order values to transmitting station 160 in, for example, an access channel (process step 710).

Next, transmitting station 160 determines the largest channel order value and then determines and selects an optimal quasi-periodic distribution (process step 715). Transmitting station 160 then transmits the selected quasi-periodic distribution configuration data to receiving stations 171–173 (process step 720). Receiving stations 171–173 receive the selected quasi-periodic distribution configuration data and adjust known symbol generator 430 in block DFE 325 accordingly (process step 725). Finally, transmitting station 160 and receiving stations 171–173 operate in, for example, a traffic channel using the selected quasi-periodic distribution configuration data (process step 730).

Although the present invention has been described in detail, those skilled in the art should understand that they can make various changes, substitutions and alterations herein without departing from the spirit and scope of the invention in its broadest form.

What is claimed is:

1. A transmitter for transmitting a stream of known symbols and unknown symbols through a transmission channel to a first receiver that receives the transmitted stream of known symbols and unknown symbols distorted by intersymbol interference (ISI) and reduces an ISI signal, the transmitter comprising:

a known symbol distribution controller capable of inserting a plurality of known symbol clusters into an outgoing stream of unknown symbols in an optimum distribution in order to improve the performance of the first receiver, said known symbol distribution controller being capable of determining a channel order, L, associated with the receiver; wherein said transmitted stream of known symbols and unknown symbols is received by a plurality of receivers;

the known symbol distribution controller is capable of determining a plurality of channel orders, $L_1$ through $L_n$, each channel order being associated with a corresponding one of said plurality of receivers; and said known symbol distribution controller determines the optimum distribution according to a value of the channel order.

2. The transmitter as set forth in claim 1 wherein said known symbol distribution controller determines a minimum size of each of the plurality of known symbol clusters according to the value of the channel order.

3. The transmitter as set forth in claim 1 wherein said known symbol distribution controller is capable of determining a maximum one of the plurality of channel orders.

4. The transmitter as set forth in claim 3 wherein said known symbol distribution controller determines the optimum distribution according to a value of the maximum channel order.

5. The transmitter as set forth in claim 4 wherein the known symbol distribution controller determines a minimum size of each of the plurality of known symbol clusters transmitted to all of the plurality of receivers according to the value of the maximum channel order.

6. A network comprising:

a plurality of receivers, each of said receivers capable of receiving from a transmission channel an incoming stream of known symbols and unknown symbols distorted by intersymbol interference (ISI), wherein each of said receivers comprises a block decision feedback equalizer capable of receiving the transmitted stream of known symbols and unknown symbols distorted by intersymbol interference (ISI) and reducing therein an ISI signal; and a transmitter for transmitting a stream of known symbols and unknown symbols through a transmission channel to a first receiver, wherein the transmitter comprises a known symbol distribution controller capable of inserting a plurality of known symbol clusters into an outgoing stream of unknown symbols in an optimum distribution in order to improve the performance of a first receiver, wherein said known symbol distribution controller is capable of determining a channel order, L, associated with the first receiver, and wherein said known symbol distribution controller determines the optimum distribution according to a value of the channel order.

7. The network as set forth in claim 6 wherein said known symbol distribution controller determines a minimum size of each of the plurality of known symbol clusters according to the value of the channel order.

8. The network as set forth in claim 6 wherein said transmitted stream of known symbols and unknown symbols is received by the plurality of receivers and wherein the known symbol distribution controller is capable of determining a plurality of channel orders, $L_1$ through $L_n$, wherein each channel order is associated with a corresponding one of said plurality of receivers.

9. The network as set forth in claim 8 wherein said known symbol distribution controller is capable of determining a maximum one of the plurality of channel orders.

10. The network as set forth in claim 9 wherein said known symbol distribution controller determines the optimum distribution according to a value of the maximum channel order.

11. The network as set forth in claim 10 wherein the known symbol distribution controller determines a minimum size of each of the plurality of known symbol clusters transmitted to all of the plurality of receivers according to the value of the maximum channel order.

12. For use in a network comprising a transmitter and a plurality of receivers, wherein each receiver receives from a transmission channel an incoming stream of known symbols and unknown symbols distorted by intersymbol interference (ISI), and wherein each receiver comprises a block decision feedback equalizer capable of receiving the transmitted stream of known symbols and unknown symbols distorted by intersymbol interference (ISI) and reducing therein an ISI signal, a method of transmitting the known symbols and unknown symbols comprising the steps of:

inserting a plurality of known symbol clusters into an outgoing stream of unknown symbols in an optimum distribution capable of improving the performance of a first one of the receivers;

transmitting the stream of known symbols and unknown symbols according to the optimum distribution;

determining a plurality of channel orders, $L_1$ through $L_n$, wherein each channel order is associated with a corresponding one of said plurality of receivers; and determining a maximum one of the plurality of channel orders.

13. The method as set forth in claim 12 further comprising the step of determining the optimum distribution according to a value of the maximum channel order.

14. The method as set forth in claim 13 further comprising the step of determining a minimum size of each of the plurality of known symbol clusters transmitted to all of the plurality of receivers according to the value of the maximum channel order.

15. The transmitter of claim 1, wherein the known symbol distribution controller is capable of inserting the plurality of known symbol clusters into a plurality of positions in the outgoing stream of unknown symbols.

16. The network of claim 6, wherein the known symbol distribution controller is capable of inserting the plurality of known symbol clusters into a plurality of positions in the outgoing stream of unknown symbols.

17. The network of claim 6, wherein the known symbol distribution controller determines a minimum size of each of the plurality of known symbol clusters according to the value of the channel order.

18. The method of claim 12, wherein transmitting the stream of known symbols and unknown symbols comprises inserting the plurality of known symbol clusters into a plurality of positions in the stream.

19. The method claim 12, further comprising determining a minimum size of each of the plurality of known symbol clusters according to the value of the maximum channel order.

* * * * *